Patented Apr. 9, 1935

1,996,744

UNITED STATES PATENT OFFICE 1,996,744

PHENOL AND PREPARATION THEREOF

Edgar C. Britton, Midland, Mich., assignor to The Dow Chemical Company, Midland, Mich., a corporation of Michigan No Drawing. Application March 2, 1931, Serial No. 519,693

8 Claims. (Cl. 260—154)

The present invention concerns methods of preparing phenols by the hydrolysis of an aromatic halo compound, particularly to a method for preparing substituted phenols by hydrolysis of a substituted aromatic chlorohydrocarbon.

It was formerly supposed that hydrolysis of a halogenated aromatic hydrocarbon proceeds to the formation of the corresponding hydroxy derivative, Meyer and Bergius (Ber. 47; 3155: 1914), for instance, obtaining solely para-cresol by the alkaline hydrolysis of para-chloro toluene. I now have found that, when an aryl- or alkyl-substituted aromatic halohydrocarbon is hydrolyzed at a relatively high temperature, i. e. 300° to 400° C., in the absence of copper, unexpectedly there is formed a substituted phenol in which the hydroxy group is in a position which is ortho or para to the original position of the halogen, together with a certain amount of the expected phenol in which the hydroxy group occupies the original halogen position. The so produced mixture of phenols may be separated and the individual components thereof obtained in high yields. Hence, such new method may advantageously be used to prepare compounds useful in pharmaceutical, medical, and perfumery fields, etc., but not hitherto prepared by direct methods.

Such hydrolysis can be explained by the addition of water, either 1:2 or 1:4, to the halogen substituent in the nucleus (considering the halogen as being in position 1) followed by removal of hydrohalide acid therefrom, to form, for instance, both ortho-phenylphenol and meta-phenylphenol from ortho-chlorodiphenyl. In the same way, para-phenylphenol and meta-phenylphenol can be formed from para-chlorodiphenyl, and so on. I have found that such hydroxy compounds cannot similarly be converted into isomers thereof by treating with alkalies in like manner, hence the hereindescribed hydrolytic reaction is to be considered as a reaction "in situ", and not a rearrangement or migration.

Accordingly, my invention, then, consists of the method and steps herein fully described and particularly pointed out in the claims, the following description setting forth in detail several modes of carrying out my invention, such disclosed modes illustrating, however, but several of various ways in which the principle of my invention may be used.

In general, my invention may be carried out as follows:—Chlorodiphenyl, as representing the above mentioned class of halogenated hydrocarbons, is mixed with a moderate excess of aqueous sodium hydroxide solution of approximately 3 to 25 per cent strength, in a ratio of about 1.5 to 5 mols of said base per one mol of chlorodiphenyl. The mixture is heated under pressure at a temperature between about 300° and about 400° C., in the absence of catalytic copper, in a suitable apparatus, e. g. an autoclave or bomb, the surfaces thereof contacting with the reaction mixture preferably being constructed of iron, nickel, or equivalent thereof, the apparatus being provided with means for agitating the contents thereof. A tubular autoclave system may also be used, if desired. The heating is continued for approximately 1 or 2 hours, or longer if necessary, to obtain the desired conversion. The so obtained reaction mixture is then treated in any suitable way to isolate and recover the separate constituents thereof. For instance, the cooled or hot reaction mixture may be extracted with a water-immiscible solvent such as benzene, chlorobenzene, carbon tetrachloride, or equivalent thereof, to remove alkali-insoluble ethers, i. e. di-diphenyl oxides, which may then be recovered by distillation of the solvent therefrom. The residual aqueous solution may then be acidified with any suitable acid, e. g. hydrochloric or sulfuric acid, and the thereby precipitated phenylphenols separated from residual liquors and fractionally distilled or otherwise separated. By distillation of mixed ortho-, meta-, and para-phenylphenols, ortho-phenylphenol distills over first, followed by the corresponding meta and para compounds which boil very close to each other and accordingly distill together. Hence, a mixture of ortho- and meta-phenylphenols can substantially be separated by fractional distillation, whereas a mixture of the para- and meta-compounds preferably is separated into the components thereof by recrystallization from suitable solvents, by fractional acidification of an alkaline solution thereof, by fractional precipitation of insoluble salts from an aqueous alkaline solution with a precipitant such as lime or calcium chloride, or in any other suitable way.

When ortho-chlorodiphenyl, for instance, is reacted with aqueous sodium hydroxide under the above conditions, there is obtained not only the expected ortho-phenylphenol but also the unexpected meta-phenylphenol, the amount of the latter formed in the reaction depending largely on the temperature of reaction and to a lesser extent on the concentration of the alkali employed. For instance, the hydrolysis of ortho-chloro-diphenyl at 300° and 360° C. produces meta-phenylphenol in amount of about 20 per cent and 70 per cent, respectively, of the hydrolyzed product.

There is always produced a certain amount of di-diphenyl oxides, the formation of the latter depending more on the concentration and amount of base than on the temperature of reaction. Corresponding results are obtained by hydrolyzing para-chlorodiphenyl in a similar way, although a lesser amount of meta-phenylphenol is produced than by the hydrolysis of ortho-chlorodiphenyl. For instance, by hydrolyzing para-chlorodiphenyl at temperatures of 300° and 360° C., yields of meta-phenylphenol of about 5 per cent and 25 per cent, respectively, of the product are obtained, the remaining phenylphenol so produced being the expected para compound.

Similar results can be obtained from other substituted halohydrocarbons. Ortho-chlorotoluene yields a mixture of both ortho- and meta-cresol when treated in a similar manner, the meta compound being producible in an excess of 50 per cent yield, based on the product obtained. Likewise, the alkaline hydrolysis of ortho-chlorocymene results in a mixture of the expected ortho-cymol and meta-cymol, the latter being the well known antiseptic and bactericide, thymol. Moreover, my invention may be adapted to the hydrolysis of a mixture of halogenated hydrocarbons, such as a mixture of ortho- and para-chlorodiphenyls, or a mixture of ortho- and para-chloro-toluenes, to produce a mixture of phenols which may or may not then be separated into the components thereof.

The following examples represent various ways of carrying out my invention:—

Example 1

A mixture of 1 mol of ortho-chlorotoluene, 2.75 mols of sodium hydroxide, and 1090 cc. of water was heated to a temperature of about 350° to 360° C. in about ½ hour, and maintained thereat for 1 hour in a rotating fin-equipped steel bomb. The aqueous reaction mixture was removed from the bomb, acidified with hydrochloric acid, and extracted with benzene to remove cresols therefrom. The benzene extract, including the cresols, was fractionally distilled, (the boiling point range of the mixed cresol fraction being from 84° to 90° C. at 8 to 9 mm. pressure, or 192° to 201° C. at 750 mm.), thereby obtaining a 77 per cent yield of cresols, consisting of 59 per cent of meta-cresol and 41 per cent of ortho-cresol, based on the amount of cresols produced.

Example 2

In a similar way, 1 mol of pure meta-chlorotoluene was treated with 1.1 kilograms of 10 per cent aqueous sodium hydroxide solution for 1 hour at 350° to 360° C. The reaction mixture was extracted with benzene to remove ditolyl ethers therefrom, the residual aqueous layer acidified with hydrochloric acid, and the cresols extracted therefrom with benzene. The benzene-cresol solution was fractionally distilled, obtaining 0.8 mol of mixed cresols which then were monosulfonated by concentrated sulfuric acid, and treated with superheated steam. By the last operation, the sulfonic acids were hydrolyzed and separated into their respective phenols, thereby obtaining approximately 0.465 mol of meta-cresol and a mixture of 0.335 mol of ortho- and para-cresols in appproximately equal proportions by weight.

Example 3

A charge of 1.45 mols of ortho-chlorodiphenyl (m. p. 31° C.), 4.4 mols of sodium hydroxide, and 1300 cc. of water was reacted at a temperature of 350° to 360° C. for 1 hour in a rotating fin-equipped steel bomb. The reaction mixture was cooled, acidified, and the mixed phenylphenols fractionally distilled, thereby yielding 0.29 mol of ortho-phenylphenol and 0.792 mol of meta-phenylphenol, or 20 per cent and 55 per cent yields, respectively, based on the charge. As a by-product, there was obtained 0.062 mol of alkali-insoluble ethers.

Example 4

1 mol of para-chlorodiphenyl was reacted as above with 2 mols of 10 per cent aqueous sodium carbonate for ½ hour at a temperature of substantially 360° C., and maintained thereat for 3 hours, thereby obtaining a product comprising meta- and para-phenylphenols in the proportion of about 25 per cent and 75 per cent of the meta and para isomers, respectively.

Example 5

Similarly, a mixture of 4 mols each of ortho- and para-chlorodiphenyls was reacted with 8.9 kilograms of 10 per cent aqueous sodium hydroxide for 1 hour at 350° to 360° C., thereby obtaining a practically quantitative conversion. The reaction mixture was extracted with benzene to remove alkali insoluble ethers, and the aqueous layer acidified with hydrochloric acid to precipitate mixed phenylphenols which were then separated, thereby obtaining 17, 50, and 33 per cent, respectively, of ortho-, meta-, and para-phenylphenols, together with approximately 162 grams of ethers plus tar.

Example 6

Similarly, as in Example 3, 0.2 mol of ortho-chlorodiphenyl was reacted with 160 cc. of 10 per cent sodium hydoxide for 1 hour at 360° C. in a nickel bomb. The ortho-chlorodiphenyl was thereby 93 per cent converted into a mixture of phenylphenols comprising 52.5 per cent and 48.5 per cent, respectively, of the meta and ortho isomers. As a by-product, there was obtained 6 grams of alkali-insoluble di-diphenyl ether.

Example 7

Example 6 was duplicated using para-chlorodiphenyl instead of the corresponding ortho compound, thereby obtaining a 92 per cent conversion of starting material into a mixture of phenylphenols comprising 80 per cent and 20 per cent of the para and meta isomers, respectively, together with 3 grams of di-diphenyl ether as a by-product.

In brief, my invention relates to the hydrolysis of a hydrocarbon of the following general formula, R—Z—X, (wherein Z represents a residue of an aromatic hydrocarbon, X a bromo or chloro group, and R a hydrocarbon group), with a suitable hydrolytic agent, such as an alkali-metal hydroxide, carbonate, or borate, or a mixture of two or more of such agents, or equivalent thereof, in the substantial absence of copper, and under conditions whereby the halogen group is replaced by hydrogen, and a hydroxy group replaces a hydrogen in a position either ortho or para thereto. In my copending application Serial No. 519,692, filed March 2, 1931, I have shown that there is no substantial formation of isomeric phenols in hydrolytic reactions of the character in hand when a copper-containing catalyst, particularly metallic copper, is present. It is essential, then, that copper be absent for accomplishing the substitution of hydroxyl in a position in the aromatic nucleus other than that occupied by the halogen originally, in order to carry out the process in accordance with the present invention.

The novel reaction products obtainable by my herein described process, for instance, a mixture of phenols, with or without the by-products formed, e. g. ethers, or mixed ethers, and in varying proportion, dependent on the conditions of the hydrolysis, may advantageously be employed as such for disinfectant, insecticidal, or other purpose without undergoing unnecessary separation into the components thereof.

In the claims, by the term "copper", I mean copper capable of catalytically affecting the hydrolytic reaction, such as inner copper-lined surfaces of the reactor, copper powder not in contact with a less noble metal, e. g. iron, or a dissolved copper compound, e. g. cuprous oxide.

Other modes of applying the principle of my invention may be employed instead of those explained, change being made as regards the method herein disclosed, provided the details stated by any of the following claims or the equivalent thereof be employed.

I therefore particularly point out and distinctly claim as my invention:—

1. The method which comprises reacting a monochlorinated aromatic hydrocarbon having the general formula,

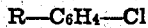

wherein R represents an aryl or alkyl group, with an aqueous sodium hydroxide solution by heating under pressure at a temperature between about 300° and about 400° C. in the absence of catalytically active metallic copper or copper compound, whereby a substituted phenol is formed in which the hydrogen occupies the original chlorine position and the hydroxy group is in a position ortho or para to the same.

2. The method of making an aryl- or alkyl-substituted meta-phenol which comprises reacting a substituted aromatic halo-hydrocarbon having the general formula;

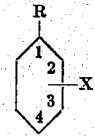

wherein R is an aryl or alkyl group and X a halogen substituent which is in position 2 or 4, by heating under pressure at a temperature between about 300° and about 400° C. with an aqueous hydrolytic agent from the group consisting of the alkali-metal hydroxides, carbonates and borates, in the absence of catalytically active metallic copper and copper compounds, whereby a component of a substituted phenolic compound is formed in which the phenolic group is in position 3, and separating such meta-phenolic compound from the reaction product.

3. The method of making an aryl- or alkyl-substituted meta-phenol which comprises reacting a substituted aromatic halo-hydrocarbon having the general formula;

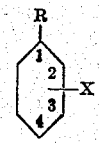

wherein R is an aryl or alkyl group and X a halogen substituent which is in position 2 or 4, by heating under pressure at a temperature between about 300° and about 400° C. with an aqueous hydrolytic agent from the group consisting of the alkali-metal hydroxides, carbonates and borates, in the absence of a catalyst, the reactor surfaces in contact with the reaction mixture being composed substantially of metallic iron, whereby a component of a substituted phenolic compound is formed in which the phenolic group is in position 3, and separating such a meta-phenolic compound from the reaction product.

4. The method of making meta-cresol which comprises reacting a compound from the class consisting of ortho-chlorotoluene and para-chloro-toluene by heating under pressure at a temperature between 300° and 400° C. with an aqueous hydrolytic base in the absence of catalytically active metallic copper or copper compounds, and separating meta-cresol from the reaction product.

5. The method of making meta-cresol from a mixture of ortho and para-chlorotoluenes which comprises reacting such mixture with aqueous sodium hydroxide under pressure at a temperature of 300° to 400° C. in the absence of catalytically active metallic copper or copper compound and separating meta-cresol from the thereby formed mixture of cresols.

6. The method of making meta-phenylphenol which comprises reacting a compound from the class consisting of ortho-chloro-diphenyl and para-chloro-diphenyl by heating under pressure at a temperature between 300° and 400° C. with an aqueous hydrolytic base in the absence of catalytically active copper or copper compounds, and separating meta-phenylphenol from the reaction product.

7. In the preparation of meta-phenylphenol, the step which consists in reacting ortho-chlorodiphenyl with aqueous sodium hydroxide solution under pressure at a temperature between 300° and 400° C. in the absence of catalytically active metallic copper or copper compound and separating meta-phenylphenol from the reaction product.

8. The method of making meta-phenylphenol from a mixture of ortho and para-chlorodiphenyls which comprises reacting the latter mixture with aqueous sodium hydroxide under pressure at a temperature of 300° to 400° C. in the absence of catalytically active metallic copper or copper compound and separating meta-phenylphenol from the thereby formed mixture of phenylphenol.

EDGAR C. BRITTON.